(12) United States Patent
Olin

(10) Patent No.: US 9,239,257 B2
(45) Date of Patent: Jan. 19, 2016

(54) MASS FLOW METER CONFIGURED WITH COMPUTATIONAL MODELING FOR USE WITH DIFFERENT FLUIDS

(71) Applicant: SIERRA INSTRUMENTS, INC., Monterey, CA (US)

(72) Inventor: John G. Olin, Carmel Valley, CA (US)

(73) Assignee: SIERRA INSTRUMENTS, INC., Monterey, CA (US)

( * ) Notice: Subject to any disclaimer, the term of this patent is extended or adjusted under 35 U.S.C. 154(b) by 0 days.

(21) Appl. No.: 14/664,404

(22) Filed: Mar. 20, 2015

(65) Prior Publication Data

US 2015/0192442 A1 Jul. 9, 2015

Related U.S. Application Data

(63) Continuation of application No. PCT/US2012/056664, filed on Sep. 21, 2012.

(51) Int. Cl.
*G01F 1/68* (2006.01)
*G01F 1/692* (2006.01)

(52) U.S. Cl.
CPC .................................. *G01F 1/692* (2013.01)

(58) Field of Classification Search
None
See application file for complete search history.

(56) References Cited

U.S. PATENT DOCUMENTS

| | | | |
|---|---|---|---|
| 3,927,567 A | 12/1975 | Novak et al. | |
| 5,325,852 A | 7/1994 | Clem | |
| 5,880,365 A | 3/1999 | Olin et al. | |
| 6,487,904 B1 * | 12/2002 | Myhre | 73/204.12 |
| 6,971,274 B2 | 12/2005 | Olin | |
| 7,197,953 B2 | 4/2007 | Olin | |
| 7,748,267 B2 | 7/2010 | Olin et al. | |
| 8,260,562 B2 | 9/2012 | Cunningham et al. | |
| 2003/0146758 A1 | 8/2003 | Koike et al. | |
| 2013/0125643 A1 * | 5/2013 | Batty et al. | 73/204.14 |

OTHER PUBLICATIONS

WO, PCT/US2012/056664 ISR, Feb. 5, 2013.
WO, PCT/US2012/056664 IPRP, Apr. 2, 2015.
King, L.V., "On the Convection of Heat from Small Cylinders in a Stream of Fluid: Determination of the Convection Constants of Small Platinum Wires with Applications to Hot-Wire Anemometry", Phil. Trans. Roy. Soc., 1914, vol. 90, No. 622, pp. 373-432.

* cited by examiner

*Primary Examiner* — Harshad R Patel
(74) *Attorney, Agent, or Firm* — One LLP

(57) ABSTRACT

Microprocessor-based thermal dispersion mass flow meters (i.e., thermal anemometers) are described that use temperature sensing elements in its flow sensor probe(s) in addition to the two elements commonly used. Such systems allow for automatically managing changes in gas selection, gas temperature, gas pressure, and outside temperature. One mass flow meter described has a flow sensor with four temperature sensing elements, wherein one pair is provided in a temperature sensor probe and another pair in a velocity sensor probe. Another variation operates without a separate temperature sensor probe and integrates all function into a single three-sensor probe. Such a device may also be used in conjunction with a one- or two-sensor temperature probe.

20 Claims, 5 Drawing Sheets

MASS FLOW METER CONFIGURED WITH COMPUTATIONAL MODELING FOR USE WITH DIFFERENT FLUIDS

CROSS-REFERENCE TO RELATED APPLICATIONS

This application claims priority to and the benefit of International Application No. PCT/US2012/056664, filed Sep. 21, 2012, which is incorporated by reference herein in its entirety and for all purposes.

FIELD OF THE INVENTION

This invention relates to mass flow meters, in configurations identified to enable computational modeling for use with different fluids and methods of use in connection with such modeling.

BACKGROUND

Thermal dispersion mass flow meters directly measure the mass flow rate of single-phase pure gases and gas mixtures of known composition flowing through pipes or other flow conduits. They also have application to single-phase liquids of known composition. In most of the following, it is assumed that the fluid is a gas, without the loss of applicability to liquids.

The mass flow rate of a fluid (defined by its average velocity multiplied by its mass density multiplied by the cross-sectional area of the channel through which the flow travels) is a measured quantity of interest in the control or monitoring of most practical and industrial applications, such as any chemical reaction, combustion, heating, cooling, drying, mixing, fluid power, etc. For such purposes, gases monitored by industrial thermal dispersion mass flow meters typically include: air, methane, natural gas, carbon dioxide, nitrogen, oxygen, argon, helium, hydrogen, propane, and stack gases, as well as mixtures of these gases and mixtures of hydrocarbon gases.

Generally speaking, a thermal anemometer (alternatively referred to as a thermal dispersion mass flow meter or simply as a mass flow meter) is used to measure the mass velocity at a point or small area in a flowing fluid—be it liquid or gas. The mass velocity of a flowing fluid is its velocity referenced to standard (or normal) temperature and pressure. The mass velocity averaged over the flow channel's cross-sectional area multiplied by the cross-sectional area is the standard (or normal) volumetric flow rate through the channel and is a common way of expressing the total mass flow rate through the channel.

The thermal anemometer is sometimes referred to as an immersible thermal mass flow meter because it can be immersed in a flow stream or channel in contrast to other thermal mass flow meter systems, such as those that sense the total mass flow rate by means of a heated capillary tube mounted externally to the flow channel.

The first general description of a thermal anemometer is attributed to L. V. King who, in 1914, published "King's Law" revealing how a heated wire immersed in a fluid flow measures the mass velocity at a point in the flow: King, L. V. 1914, "On the convection of heat from small cylinders in a stream of fluid: Determination of the convection constants of small platinum wires with application to hot-wire anemometry." Phil. Trans. Roy. Soc. A214: 373-432. King called his instrument a "hot-wire anemometer."

Early applications of this technology were hot-wire and hot-film anemometers and other light-duty thermal dispersion flow sensors used in fluid mechanics research and as light-duty mass flow meters and point velocity instruments. It was not until the 1960s and 1970s that industrial-grade thermal dispersion mass flow meters emerged that could solve the wide range of general industry's more ruggedized needs for directly measuring the mass flow rate of air, natural gas, and other gases in pipes and ducts.

Thermal dispersion mass flow meters measure the heat convected into the boundary layer of a fluid (e.g., liquid or gas) flowing over the surface of a heated velocity sensor immersed in the flow. Since it is the molecules of the gas that bear its mass and carry away the heat, thermal dispersion mass flow meters directly measure mass flow rate. In a constant-temperature mode of operation, the "heated" sensor (as commonly known) incorporated in the design is maintained at an average constant temperature above the fluid temperature. The temperature difference between the flowing fluid and the heated sensor results in an electrical power demand in maintaining this constant temperature difference that increases in proportion to the fluid mass flow rate that can be calculated. In another approach, some thermal anemometers operate in a constant-current mode in which a constant current or power is applied to the heated sensor and the fluid mass flow rate is calculated from the difference in the temperature of the heated sensor and the fluid temperature sensor, which decreases as mass flow rate increases.

Thermal anemometers may have greater application to gases, rather than liquids, because their sensitivity in gases is higher than in liquids. However certain examples described herein may be equally applicable to mass flow meters for use with liquids.

Many of the mass flow meters currently known may have shortcomings, some or all of which may be addressed by the present disclosure. For example, because the parts of the heated sensor of known thermal anemometers are not sufficiently reproducible (i.e., dimensionally or electrically), known thermal anemometers require multi-point flow calibration of electrical output versus mass flow rate, in the actual fluid with which they will be used and within the actual ranges of fluid temperature and pressure of the particular application. With such a multi-point flow calibration, some level of flow measurement accuracy may be attainable, however the accuracy is only be applicable to the particular fluid used for calibration only within the narrow ranges of fluid temperature and pressure within which the calibration was conducted.

For industrial applications, the separate heated velocity and fluid temperature sensors are typically enclosed in a protective housing shell. Sometimes, the heated sensor is inserted into the tip of the housing shell and surrounded by a potting compound, such as epoxy, ceramic cement, thermal grease, or alumina powder. In such systems, "skin resistance" and stem conduction are two major contributors to non-ideal behavior and measurement errors. The so-called "skin resistance" is the electrical analog of thermal resistance occurring between the encased heated sensor and the external surface of the housing exposed to the fluid flow. Hot-wire thermal anemometers have zero skin resistance, but thermal anemometers with a housing shell do have some skin resistance. The use of a potting compound substantially increases the skin resistance because such potting compounds have a relatively low thermal conductivity and are relatively thick.

Skin resistance (in units of degrees Kelvin per watt) results in a temperature drop between the encased heated sensor and the external surface of the housing that increases as the electrical power supplied to the heated sensor increases. Skin resistance creates a "droop" and decreased sensitivity in the power versus fluid mass flow rate calibration curve, especially at higher mass flow rates. The so-called droop is difficult to quantify and usually varies from meter to meter because of variations in manufacturing repeatability and in installation. The ultimate result of these skin-resistance problems is reduced accuracy. Furthermore, the use of a surrounding potting compound can create long-term measurement errors caused by aging and by cracking due to differential thermal expansion between the parts of the heated sensor.

Accordingly, the highest quality heated sensors have a skin resistance with a low numerical value that remains constant over the long term. Of all known sensor configurations, the most successful at managing these tradeoffs has been produced by the assignee hereof, Sierra Instruments in U.S. Pat. Nos. 5,880,365; 6,971,274; 7,197,953 and/or 7,748,267, the disclosures of which patents are incorporated herein by reference in their entirety.

Velocity sensor probes constructed as such may be known as "dry" sensors in contrast to velocity sensors fabricated with potting cements or epoxies that are wet when mixed. As discussed, these "wet" velocity-sensor systems suffer long-term stability and other quality issues due to changes in the potting compound. With regards to the temperature sensors, degradation of any potting material incorporated in temperature sensor probes may only change response time, which may be a relatively minor effect, and as such temperature sensor probes may employ any convenient construction.

A significant source of potential error in either the temperature sensor probe and/or velocity sensor probe relates to heat conduction along the probe stem. For example, stem conduction causes a large fraction of the electrical power supplied to the heated sensor to be lost through the stem of the heated sensor, down the housing, lead wires, and other internal parts of the heated sensor and ultimately to the exterior of the fluid flow channel. Stem conduction couples the electrical power supplied to the encased heated sensor to the ambient temperature outside the channel. Typically, if the ambient temperature decreases, stem conduction increases; if ambient temperature increases, the conduction decreases. In either case, as ambient temperature changes, stem conduction changes, and measurement errors occur. Similarly, stem conduction is responsible for errors in the encased fluid temperature sensor's measurement because the fluid temperature sensor also is coupled to the ambient temperature in this manner. Mass flow meters known in the art do not account for stem conduction in sufficient manner to achieve the measurement accuracy as may be desired in certain applications.

Accordingly, the examples described herein may provide systems and methods for measuring mass flow of a fluid with improved performance, including (but not limited to) the ability to meter different fluids without requiring flow calibration specific to the fluid or conditions being monitored, as well as the ability to account for mode(s) of stem conduction heretofore unrecognized and, thus, obtain measurements with increased accuracy.

SUMMARY

Examples of thermal dispersion mass flow meters (interchangeably referred to herein as thermal anemometers or mass flow meters) are described, which may include "secondary" temperature sensing elements in one or more of their flow sensor probe(s). Such "secondary" temperature sensing elements may be provided in addition to the primary sensing elements. In some examples, the primary sensing elements may include the heated sensor in a velocity probe and the non-heated sensor in a temperature probe, typically located distally with respect to the velocity probe. Systems and methods according to the present disclosure may allow for automatically managing changes in gas selection, gas temperature, gas pressure, and outside temperature, as will be further described.

The subject mass flow meters may include one or more flow sensor probes with a plurality of Resistance Temperature Detector (RTD) temperature sensing elements. In certain examples, each of the velocity sensor probe and the temperature sensor probe, if present, may include two or more RTD elements. As such, some embodiments of the present invention may include four or more RTD elements, which may be operatively configured to achieve a desired measurement accuracy. Systems according to the present invention may offer performance with accuracy as high as from about 1% to about 2% of reading (as opposed to full scale) over mass flow rate ranges from about 10% to about 100% of full scale (or larger range) and over a wide range of fluid temperatures and pressures encountered in field applications (e.g., about +/−10 to 25 deg. K and +/−2 to 4 bar, respectively, generally referenced to their values at flow calibration) and for any of a number of commonly used fluids (e.g., most "clean" gases, including air, methane, Ar, $CO_2$, He, $N_2$, $O_2$, $C_3H_8$, and mixtures of these components). Embodiments of the invention may offer high accuracy performance for a gas or gas mixture even when flow calibration is advantageously performed with a single inexpensive surrogate gas operated at inexpensive conditions (e.g., air at ambient conditions).

In one example, a first pair of RTD elements may be provided in the velocity sensor probe of a mass flow meter, and a second pair of RTD elements may be provided in the temperature sensor probe of the mass flow meter. Each of the RTD elements in the first pair and/or in the second pair may be arranged in a spaced apart configuration, as will be further described, to facilitate measurements according to the examples described. Another variation may be configured without a separate temperature sensor probe, and the functionality of the velocity probe and the fluid temperature probe may be integrated into a single three-sensor probe. In yet other examples, such integrated three-sensor probe may be used in conjunction with an additional one- or two-sensor fluid temperature probe.

In a coordinated system, mass flow meters according to the present disclosure couple the flow sensor hardware with microprocessor-based electronics programmed with algorithms that manage changes in gas selection, gas temperature, gas pressure and outside temperature. Multivariable versions provide analog and digital outputs of mass flow rate, gas temperature, and (optionally) gas pressure. A selection of sophisticated digital communication protocols commonly used by industry may also be made available.

In reference to the temperature sensor probe, the data collected from the secondary sensor may be used to account specifically for conduction of heat into or out of the probe. As such, it is desirable that the distance between the temperature sensors in the temperature probe is maximized (given all other fit constraints) in order to offer the greatest temperature spread/differential and thereby provide better data resolution and accuracy.

In reference to the velocity sensor probe, in one embodiment of the present invention, a thin-film RTD (TFRTD) sensor is not used for the heated sensor. Instead, a wire-wound heated RTD sensor is employed. Important aspect(s) regarding the use of a wire-wound RTD in place of a thin-film RTD will become apparent in view of the discussion of the computational models possible with such configuration. Further, the secondary sensor of the velocity sensor probe may be placed adjacent the proximal end of a heated length of the wire-wound RTD sensor. The distance between the secondary sensor and the heated length is advantageously minimized. The separation between the secondary sensor and the heated length (e.g. the distance between the two) may be less than about three diameters of the probe to satisfy assumptions made for use of the computational models described below. In certain examples, the distance may be about two diameters of the probe, or in other examples, the distance may be about one diameter of the probe. Indeed, the active region of the secondary sensor may be in contact with the heated length. Then, with such spacing options, the sensor data is variously used according to methods described herein. As such, the importance of the sensor spacing in the velocity sensor probe will be appreciated in view of the computational models adapted to be used in conjunction with the hardware (e.g. sensor probes) described herein.

If the secondary sensor is positioned with its active area in contact with the proximal end of the heated length, its temperature data can be directly used as the boundary condition for the proximal end in the solution for the differential equitation shown below as Equation (1) used in system analysis. If separated by a distance, or gap, the temperature measured provides this boundary condition to the solution by means of nodal analysis (included in such analysis are Finite Element Analysis (FEA) and other known methods such as electrical analog models) or by differential equation analysis (with ordinary or partial differential equations linked together via their boundary conditions).

A model is provided for the axial temperature distribution $T_1(x)$ for a heated control volume (alternatively referred to as the "heated length") of a velocity sensor comprising the heated winding, its binder/coating and the insulating substrate upon which it is wound (i.e., the mandrel or glans) per the following equation:

$$\underbrace{\Upsilon \frac{d^2 T_1(x)}{dx^2}}_{\text{Conduction In}} - \underbrace{\pi h_e D[T_1(x) - T]}_{\text{Convection Out}} + \underbrace{\left(\frac{I_1^2 R_{1,0}}{L_1}\right)[1 + \alpha(T_1(x) - T_o)]}_{\text{Electrical Power In}} = 0 \quad (1)$$

where x is the axial dimension of the heated length; γ is the overall axial conductance (kA); D is the outside diameter of the velocity probe; T is the gas temperature; $I_1$ is the measured electrical current supplied to the winding; $R_{1,0}$ is the electrical resistance of the winding at reference temperature $T_0$; $L_1$ is the length of the winding (and heated length); and α is the temperature coefficient of resistance of the winding.

Notably, Equation (1) is related to the differential equation derived by Bruun (Bruun, H. H. 1995. *Hot-Wire Anemometry: Principles and Signal Analysis*. Oxford: Oxford Univ. Press.) for a hot-wire anemometer. However, in relation to the Bruun equation, Equation (1) substitutes an "effective" film coefficient $h_e$ for the classical film coefficient h in the original, expressed as:

$$h_e = \frac{h}{1 + h\pi DL_1 R_{skin}} \quad (2)$$

where $R_{skin}$ is the electrical analog of thermal resistance for various layers of "insulation" over the heated length. Further, $h_e$ is derived from the convective heat transfer rate $Q_1$ from the control volume, or heated length, as shown in the following equation:

$$Q_1 = h(\pi DL_1)(T_e - T) = h_e(\pi DL_1)(T_1 - T) \quad (3)$$

where $T_e$ is the average temperature of the external surface of the velocity sensor probe, and $T_1$ is the average temperature of $T_1(x)$ over length $L_1$. Skin resistance $R_{skin}$ lowers external temperature $T_e$ of the control volume according to the equation:

$$T_e = T_1 - Q_1 R_{skin} \quad (4)$$

Together, these equations are used to solve for mass flow rate as further described.

In order to run the equation set as part of an effective computation model, the subject hardware must conform to the following assumptions: (a) that the temperature distribution is relatively one-dimensional in the independent variable x; (b) that a second differential equation for the temperature distribution of the housing shell is not required; and (c) that γ, $h_e$, and $R_{skin}$ are constant at their average values over length $L_1$. As for assumption (a), this may hold true with hardware where $L_1/D$ is sufficiently large (e.g., at least about 3:1 and more preferably about 4:1 or more). However, the ratio can be less than that normally required for the one-dimensionality assumption to apply. Namely, in the constant temperature mode of operation, the entire outside surface (e.g., a cylindrical surface) of the control volume is maintained at constant average temperature $T_1$ and the RTD winding maintains the entire circumferential surface of each differential slice (at a given axial location x) of the control volume at essentially the same temperature (i.e., $T_1(x)$). As such, the entire slice does not vary (or only negligibly so) with the radial or azimuthal dimensions (in cylindrical coordinates), varies only with the axial dimension x, and has a temperature $T_1(x)$ throughout.

With these assumptions in mind, then the following exponential solution for Equation (1) can be applied:

$$T_1(x) - T = B_1 e^{\beta x} + B_2 e^{-\beta x} + B_2 e^{-\beta x} + \frac{S}{\beta^2} \quad (5)$$

where:

$$\beta = \left[\frac{\pi h_e D}{\Upsilon} - \frac{\alpha I_1^2 R_{1,0}}{\Upsilon L_1}\right]^{\frac{1}{2}} \text{ (m}^{-1}\text{)}$$

$$S = \left(\frac{I_1^2 R_{1,0}}{\Upsilon L_1}\right)[1 + \alpha(T - T_O)] \text{ (K/m}^2\text{)}$$

$$B_1, B_2 = \text{Constants (K)}.$$

Associated with an analysis employing this solution, in cases where a separate temperature sensor probe is included in the system, the differential equation used in the analysis for the classical case of heat transfer from fins may be employed. As such, the performance of the temperature sensor probe may be characterized according to:

$$\frac{d^2 T_{temp}(x)}{dx^2} - \beta_{temp}^2 [T_{temp}(x) - T] = 0 \quad (6)$$

in which Equation (6) has a well known exponential solution per:

$$T_{temp}(x) - T = C_1 e^{\beta_{temp} x} + C_2 e^{-\beta_{temp} x} \quad (7)$$

where:

-continued $$\beta_{temp} = \left[\frac{\pi b_{temp} D_{temp}}{\Upsilon_{temp}}\right]^{\frac{1}{2}} (m^{-1})$$

$C_1, C_2$ = Constants (K)

and the constant coefficients are determined by boundary conditions provided by temperature data where two temperature sensors are included in the probe. As such, temperature sensor spacing is advantageously maximized to offer greater temperature spread, and thus, resolution in computed output.

So-optimized, one invention embodiment concerns a system that is configured to run the equations and output any of gas temperature and mass flow rate in response to sensor measurements and/or input pressure for a given gas (after calibration with a surrogate gas such as air) by reference to a library of properties for others.

Typically, the equations are solved in an iterative, converging method taking the closest approximation of gas temperature (e.g., from the distal sensor in a temperature sensor probe, or—if not available—from or related to the distal temperature sensor measurement in a 3-sensor velocity sensor probe) as the "seed" value in connection with other commonly-used formulae describing Reynolds, Nusselt and Prandtl numbers. So that the calculated solution offers sufficient accuracy, the hardware is configured to conform to the assumptions required above and is also preferably implemented in connection with "dry" sensor technology as noted above. Accordingly, inventive aspects cover the requisite hardware.

According to other embodiments hereof, computer readable media with instructions stored thereon implementing the solution method described herein may be provided. Such computer readable media may be implemented on a general purpose computer (e.g. as software or executable instructions stored on a recordable type media such as a hard disk drive, digital tape, compact disc or the like), or via Application-Specific Integrated Circuit (ASIC) or other hardware means. Furthermore, the computer readable media embodying aspects of the invention may advantageously be used in conjunction with the sensor configurations in any suitable combination and may be used to obtain flow measurements in real time. By "real time", it is generally meant in the context of this disclosure, that calculations performed by a chipset executing instruction according to the present solution may involve outputting and/or updating a result about every second, or in some examples up to about 5 seconds. Moreover, to be of use in monitoring an industrial process, the real time output should be continuous (i.e., delivered over a duration without interruption—on the order of hours and even days or more).

In a four-temperature sensor configuration as illustrated in the drawings with spacing between the secondary temperature sensor and the heated length in the velocity sensor probe, the mathematics employed may solve the differential equation—Equation (1)—in connection with one or more intermediate nodes. With another configuration in which a secondary sensor is immediately adjacent (i.e., touching) the proximal end of the heated length, intermediate node(s) is/are eliminated and the secondary temperature sensor may directly provide a proximal boundary condition for the differential equation solution. With another secondary sensor immediately adjacent the distal end of the heated length, the other boundary condition may be directly provided for that end of the heated length. Alternatively, a distal secondary sensor may be provided in the velocity sensor probe and calculations may optionally be made using one or more intermediate nodes.

Interestingly (whether employed at some distance in conjunction with nodal analysis modeling or located immediately adjacent), use of the third temperature sensor (i.e., a second non-heated sensor) in the velocity sensor probe permits the elimination of the temperature sensor probe altogether. As alluded to above regarding the discussion of gas temperature seed value(s), given knowledge of the average temperature of the heated sensor and its end/boundary conditions (via the secondary sensor(s)), the seed values for the temperature of flowing gas can be inferred.

Notably, for such purposes, it may actually be preferred to separate the distal secondary sensors some distance from the heated sensor. By doing so, a greater temperature difference can be measured, thereby improving the accuracy of the derived gas temperature value. A distance between about two-to-three times the diameter of the velocity sensor probe (or that of the heated sensor windings) between the heated sensor and the distal secondary sensor may be used for such purposes. Other distances exceeding two or three times the diameter of the velocity sensor probe may be used if desired, and the length of the velocity sensor probe may be so configured as to accommodate such distances.

Any and all of these hardware configurations are intended as embodiments of the present invention as well as the software methodology associated with their use. Moreover, it is to be appreciated that not all variations of the invention are practiced with an outer housing shell.

Still further, the assemblies described above may be configured in connection with relevant hardware for use as an insertion or as an in-line type flow meters. In some embodiments, complete mass flow meters include separate fluid temperature and velocity sensor probe elements. In the three-sensor velocity probe sensor variation, a complete mass flow meter assembly may utilize only one probe (i.e., the velocity sensor probe).

BRIEF DESCRIPTION OF THE DRAWINGS

The figures diagrammatically illustrate aspects of various embodiments of different inventive variations.

Variations of the embodiments shown in the figures are contemplated, and shall be considered within the scope of the claimed invention(s) explicitly, or under the Doctrine of Equivalents.

DETAILED DESCRIPTION

Figure 1A:
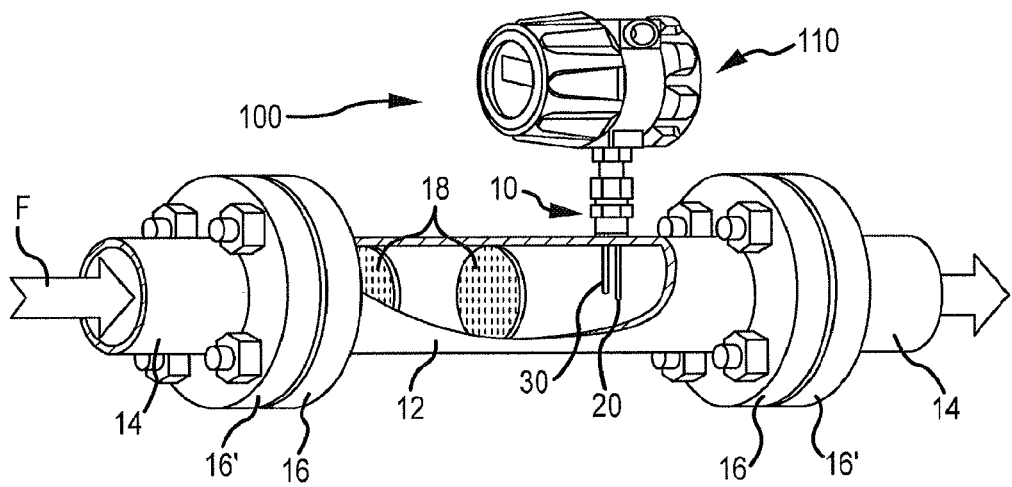
FIGS. 1A and 1B are in-line and insertion type configurations, respectively, with installed sensors as may be employed in embodiments of the present invention.
Figure 1B:
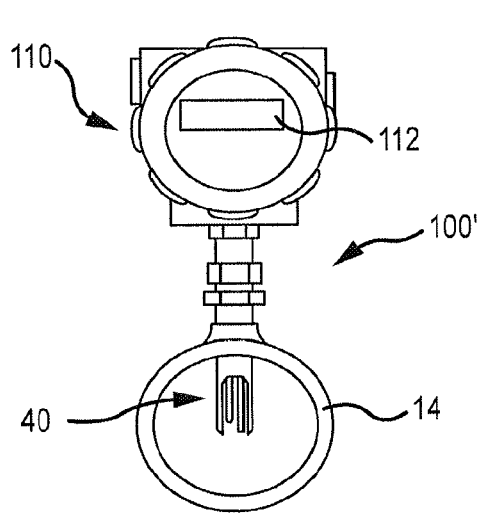

Thermal dispersion mass flow meters may generally be implemented in two primary configurations: in-line and insertion. FIGS. 1A and 1B respectively, show examples of these two configurations and their major components. In FIG. 1A, the mass flow meter assembly 100 is shown connected with an adapter 10 extending from pipe 12. Because the velocity sensor probe element 20 and the temperature sensor probe element 30 are intended to be enclosed within the pipe 12 as a delivered unit for in-line placement within a system, the sensor probe elements do not require a protective shield. The In-line mass flow meter assembly 100 is typically attached to the process piping 14 by means of flanges 16, 16'. The mass flow meter assembly 100 may also include one or more two perforated flow plates 18 provided in series and upstream of the velocity and temperatures sensor probe elements to smooth out disturbances and/or turbulence in the flow reaching the sensor probe elements.

An insertion type mass flow meter assembly 100' may include some of the same components as the mass flow meter assembly 100, and in addition may include a shield element 40 as the meter 100' is not delivered enclosed in a pipe but configured to be inserted into the process pipe 14. Both the in-line and insertion mass flow meters (e.g., 100 and 100' respectively) may also include electronics enclosed in electronics housing 110, which may include a digital readout display 112. The display 112 may be coupled to one or more processor and/or other electronics and configured to display signals corresponding to measurements and/or mass flow rate results calculated by the one or more processors. The electronics housing 110 may fully enclose the electronics necessary for performing computations, as will be described, and may include a variety of suitable electronic components, including but not limited to processors, storage, communication devices, input/output devices, and the like.

In many insertion-type and in-line configurations of mass flow meters, the velocity sensor and temperature sensor probe elements are aligned substantially perpendicular to the main fluid flow stream (F) as shown FIGS. 1A and 1B. However, in-line mass flow meter arrangements, as may be employed in connection with the teaching herein, may alternatively have their sensor probe elements arranged axially to the flow (e.g., with a longitudinal direction of the sensor probe elements disposed substantially along the direction of the flow).

In-line flow meters are typically applied to pipes and ducts with diameters typically ranging from about 10 to 100 mm (0.25 to 4.0 inch pipe sizes), but some manufacturers offer sizes up to 300 mm (12.0 inch pipe size). Process connections include flanges, pipe threads, and compression fittings. Insertion flow meters usually are applied to larger pipes, ducts, and other flow conduits having equivalent diameters typically ranging from approximately 75 mm to 5 m.

Because insertion meters are more economical than in-line meters, they also have found wide use as flow switches. Compression fittings and flanges are commonly used process connections. Insertion meters measure the mass velocity at a point in the conduit's cross-sectional area. For applications with smaller conduits, they may be flow calibrated to measure the total mass flow rate through the conduit.

Multipoint insertion meters measure the mass velocities at the centroids of equal areas in the cross section of large pipes, ducts, and stacks. The total mass flow rate through the entire conduit is the average mass velocity of the several points multiplied by the total cross-sectional area and the standard mass density of the gas.

Figure 2A:
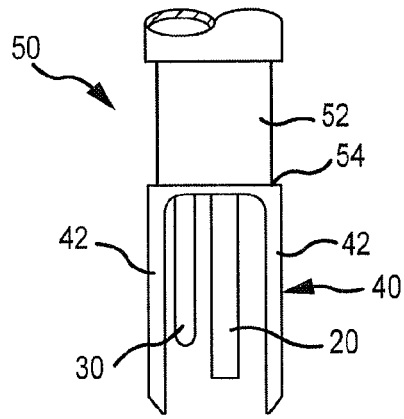
FIGS. 2A and 2B are flow-axis/direction and end-view details, respectively, of the same sensor hardware.
Figure 2B:
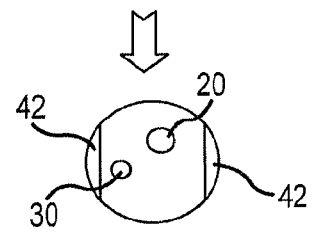

Any of such technologies/approaches may be employed in connection with the flow meters described herein. More specifically, FIGS. 2A and 2B show a flow sensor that is common to both in-line and insertion configurations comprising a housing 50 with an extension region 52 from which velocity sensor and temperature sensor probes 20, 30 extend along with shield "legs" 42—although in smaller in-line meters the flow sensor may not have a shield. Notably, housing 50 incorporates an open-ended shield 40 design and a shoulder 54.

Traditional insertion meters have a shield with a closed end that can cause the flow over the velocity sensor probe to be non-uniform and turbulent. The open-ended shield shown still protects the sensors but does not have this problem. In addition, the length of reduced diameter of extension 52 and shoulder 54 just above the flow sensor redirects and turns axial flow downwash so it flows circumferentially around the probe before it can pass over the velocity sensor probe, thereby minimizing another source of inaccuracy.

The purpose of thermal dispersion mass flow meters is to make an undistorted measurement of the free-stream velocity of a fluid just upstream of its position. Thus, the flow sensor components should not themselves create problematic flow disturbances or turbulence in the velocity field before it has passed over the velocity probe and is sensed. Features of the design of the flow sensor in FIGS. 2A and 2B accomplish this purpose. The aforementioned shoulder 54, open-ended shield 40 and shielded legs 42 (with their aerodynamic cross section) mitigate deleterious flow disturbances from the housing and shield. In addition, the location of the velocity sensor probe 20 set forward (relative to the flow) and relatively more centered within the shield avoids flow interaction with the shield and/or temperature sensor probe 30 (which is itself located downstream of, and offset from, the velocity sensor probe).

Figure 3:
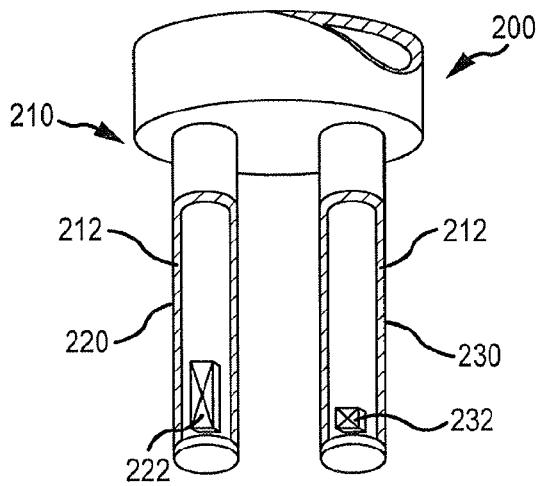
FIG. 3 is a partial section view of a known sensor configuration.

Referring now to FIG. 3, a conventional thermal dispersion flow sensor 200 is shown, which may be used in an in-line and/or an insertion type mass flow meters intended for industrial-grade applications. The flow sensor 200 includes a velocity sensor probe 220 and a temperature sensor probe 230. The velocity sensor probe 220 has an electrically self-heated (or heatable) temperature sensor element 222 located in its tip that both heats the velocity sensor probe and measures its own average temperature. The temperature sensor probe 230 has a single non-heated temperature sensor element 232 located in its tip that measures the temperature of the gas in which the flow sensor 200 is immersed. Because flow sensor 200 has a total of two temperature sensing elements (one in each probe element 220,230), it is often called a "two-temperature" flow sensor. However, as previously described and as will be further discussed, the flow sensor 200 may suffer numerous shortcomings, including problems associated with skin resistance and stem conduction.

The velocity sensor and the temperature sensor probes are mounted side-by-side in a sensor housing assembly 210. Each sensor is enclosed in a rugged, sealed, single-ended, corrosion-resistant metallic tube 212. In traditional velocity sensors of the kind shown in FIG. 3, the temperature sensor element 222 is potted into the tip of the tubular sheath. Typically, the potting, or filler material (not shown) is ceramic cement or epoxy. Heat sink grease also has been used for this purpose.

In use, the velocity sensor probe and the separate temperature sensor probe of the flow sensors illustrated are inserted or immersed in the flow stream. For that reason, thermal dispersion mass flow meters are also often called "immersible" thermal mass flow meters. Notably, the outside temperature external to the flow sensor may be different than the gas temperature in the flow conduit. For that reason, heat can be conducted in or out of the stems of the velocity sensor and the temperature sensor probes. In the field, the heat so-conducted through each stem may be different from its value at the time of flow calibration, for example if the outside temperatures or other parameters or conditions in the field are different than during calibration. Additionally, heat can be conducted from the hot velocity sensor probe 220 to the cooler temperature sensor probe 230 via their stems (i.e., the tubes 212 together with any internal components therein including the housings, wires, ferrules/spacers, etc.). These effects are further complicated because they depend on the mass flow rate. Left uncorrected, the associated stem conduction constitutes a major source of error in measuring mass flow rate.

Mass flow meters according to embodiments of the present invention may address some or all of these problems, for example the problem of stem conduction. In this regard, mass flow meters according to the present disclosure may include three or more temperature sensing elements for improved accuracy and ease of use, as will be further described. In some configurations a total of four temperature sensing elements may be included, with two elements positioned in the velocity probe and two elements in the temperature probe. In other examples, the flow sensor may not include a temperature probe, and instead three temperature sensing elements may be arranged, as will be described, in a single probe which are configured to perform all of the functionality of the flow sensor. Specific relative arrangement of the temperature sensing elements within each probe may be used so as to facilitate the use of improved algorithms for calculating certain measurements, also described herein.

Figure 4A:
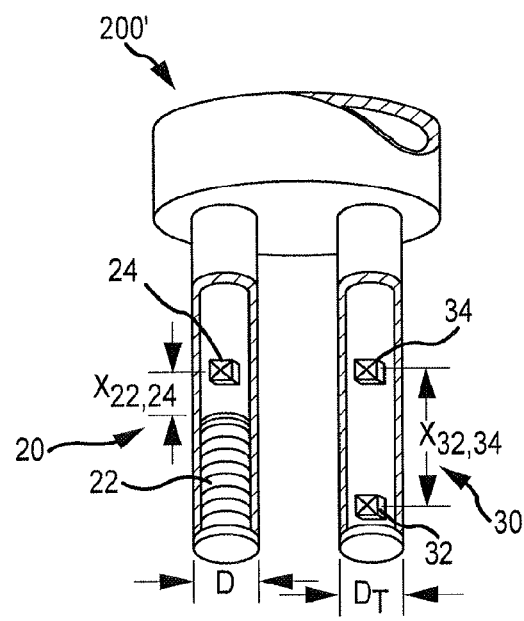
FIG. 4A is a partial section view of a sensor configuration according to one example of the present invention.

An example of a thermal dispersion flow sensor 200' is shown in FIG. 4A. The thermal dispersion flow sensor 200' includes a velocity sensor probe 20 and a temperature probe 30 according to examples of the present disclosure. The velocity sensor probe 20 may have a diameter D and the temperature sensor probe 30 may have a diameter DT, which diameters may or may not be equal. Also, each of the probes 20 and 30 may include a plurality of temperature sensing elements (e.g. elements 22, 24 and 32, 34) therein. The velocity probe 20 in the example in FIG. 4A includes two temperature sensing elements 22, 24, and the temperature probe 30 includes two temperature sensing elements 32, 34. For higher accuracy and higher stability, each of the temperature sensing elements, 22, 24 and 32, 34 may be resistance temperature detectors (e.g., platinum RTD sensors) that may be provided as thin film or wire-wound RTDs and which may be protected by a thin insulation layer of glass or ceramic. As may be known, the electrical resistance of RTDs increases as temperature increases thus providing a means for transducing/translating their electrical output into temperature. Other types of temperature sensing elements, such as thermistors, thermopiles, thermocouples, and micro-electronic machined devices, may also be used in place of or in combination with RTDs, for example for applications with lower accuracy requirements.

Figure 4B:
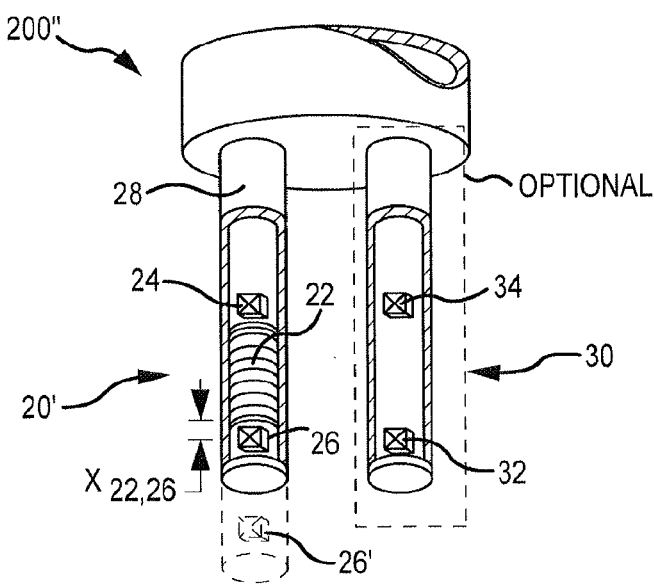
FIG. 4B is partial section view of sensor configurations according to another example of the present invention.

Another example of a thermal dispersion flow sensor 200" is shown in FIG. 4B, which may offer additional functionality, as well as certain additional flexibility in deployment configuration. The flow sensor 200" may include a velocity sensor probe 20' with a diameter D and a temperature probe 30. The velocity sensor probe 20' in this example may include three separate temperature sensing elements 22, 24, and 26 synergistically arranged as will be described below.

In each of the examples depicted in FIGS. 4A and 4B, the velocity sensor probes 20, 20' include a heated sensor 22 which is preferably implemented using a platinum wire-wound RTD construction. Used in either a constant current or constant temperature mode, the temperature sensor 22 may be referred to as a "heated" sensor to designate its physical and associated electrical character, whether or not in use. That is, the term "heated" does not imply that the sensor 22 is heated at all times, particularly when not in use. The velocity sensor probes 20, 22' may also include a second (or secondary) temperature sensor 24. The secondary sensor 24 may be implemented using a thin-film platinum RTD (TF RTD). Other ones of the temperatures sensing elements (e.g. sensors 34, 32, and 26) may also be implemented using TFRTD sensors. Such sensors are not only compact for deployment; they may also be relatively inexpensive, while capable of holding excellent tolerances. Secondary sensor 24 is typically not self-heated, but may instead be used to measure temperature.

In the example in FIG. 4A, the heated sensor 22 (e.g., wire-wound RTD) may have a proximal end and a distal end, which define a heated length ($L_1$ as in FIG. 5) of the sensor 22. The secondary sensor 24, which may be used for the purpose of compensating for stem conduction, may be located near the proximal end of the heated length in order to provide accurate boundary condition for the algorithm described below. Specifically, the distance $x_{22,24}$ separating the active region of sensor 24 and the proximal end should be less than or equal to about three times the diameter of the velocity sensor probe D. In some examples, and as shown in FIG. 4A, sensors 22, 24 may be set more closely than three times the diameter D, including being directly adjacent (i.e., touching, nearly touching or even overlapping) one another. That is, in some examples, it may be advantageous to minimize the distance $x_{22,24}$ between heated sensor 22 and sensor 24. In contrast, with respect to arrangement of sensors 32 and 34 in the temperature probe 30, it may be advantageous, for example for purpose of measured temperature range separation, to instead maximize the distance between said probes $x_{32,34}$. For example, an active region of the distal sensor 32 and an active region of the proximal sensor 34 may be separated by a distance (e.g. distance $x_{32,34}$) of at least 2 times the diameter of the temperature probe DT. In other examples, a greater than two times DT may be used, for example a distance of three times or four times the diameter. Virtually any distance depending on the length of the probe 30 may be used, provided the proximal sensor 34 is located within the flow within which the probe 30 is immersed.

As shown in FIG. 4B, another temperature sensor 26, which may be a thin-film RTD, may be included in the velocity sensor probe 20'. The active region of sensor 26 may be separated from a distal end of the wire-wound sensor 22 (e.g. heated sensor 22) by a distance $x_{22,26}$. The amount of separation of these sensors (e.g. the distance $x_{22,26}$ between heated sensor 22 and distal sensor 26) may be selected to best serve the purposes described herein. An example of one option is indicated by the dashed-line extension of housing shell 28 and more distal location of sensor 26'.

As for the different purposes: when set directly adjacent to one another (i.e., touching/overlapping) intermediate nodes (used in conjunction with the aforementioned "nodal analysis") can be eliminated in system analysis as described above; with marginally more separation (e.g., about one diameter) such analysis may utilize several nodes; set further apart (e.g., separated by about 2 to 3 diameters) additional computational intensity may be required, but the "velocity" sensor probe 20' will be better able to determine gas temperature with sensor 26—enabling the elimination of a separate "temperature" sensor probe. In the last instance, probe 20' might alternatively be referred to as a "universal" or "independent" mass flow sensor probe.

Figure 5:
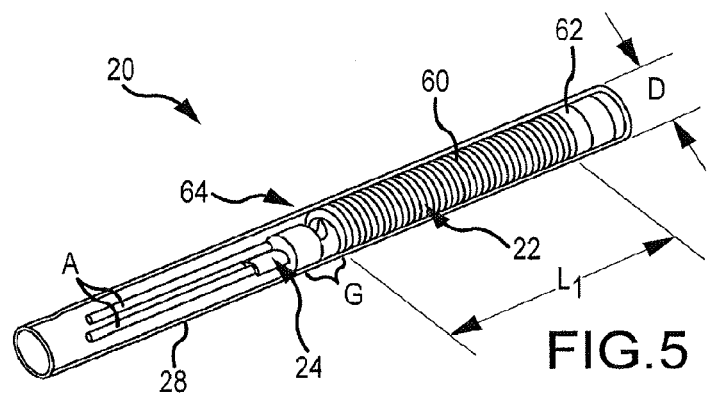
FIG. 5 is an oblique construction view of a velocity sensor probe corresponding to the embodiment shown in FIG. 4A.

However configured, in the examples shown in FIGS. 4A and 4B, the wire-wound platinum RTD sensors 22 according to the present examples typically have a resistance ranging from about 10 to about 30 Ohms. The temperature sensing elements implemented as thin-film RTDs (e.g. sensors 24, 26, 32, 34) may have resistances ranging from about 500 to about 1000 Ohms FIG. 5 illustrates an example of a construction of velocity probe 20. Here, housing shell 28 encases/encloses sensors 22 and 24 as illustrated before. Visible in more detail, is the manner in which platinum RTD wire 60 is formed in multiple turns around a mandrel (e.g., alumina) 62. The coiled length $L_1$ of the heated winding 60 is the length of the aforementioned "control volume" or "heated length" discussed in connection with Equation (1) above. The mandrel (alternatively referred to as a "glans" by those with skill in the art) includes horizontal slots 64 (obscured slot not shown) for Pt wire access into the center of the body. Electrical leads A" connected to the heated sensor wire 60 are also shown (whereas those to/from "secondary" sensor 24 are not).

This configuration of the glans is well known. New, however is the placement of a secondary temperature sensor 24 adjacent to mandrel/glans 62. As shown, it is touching the body over which the wire is wound. As such, a very predictable estimate to establish a gap G between the position of a proximal end of heated sensor 22 and the active measurement area/point of sensor 24 can be established using FEA analysis.

Still, the proximal extent of the mandrel separates the active region of sensor 24 from the proximal end of windings 60 and—thus—the proximal end of the heated sensor 22. The configuration in FIGS. 6A-6C and 7A-7C are adapted to enable closer placement of the included sensors 22, 24 (in a two-sensor variation, not shown) or 22, 24 and 26 (in the three-sensor variations, shown) to enable elimination of FEA node(s) in system analysis by directly using the temperature sensor measurement(s) as boundary condition(s) in the aforementioned mathematical modeling.

Figure 6B:
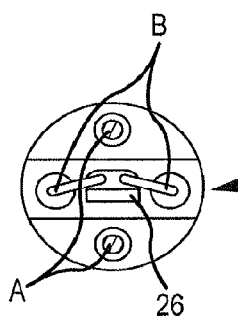
FIGS. 6A-6C are side, distal and proximal views, respectively, of a velocity sensor probe construction corresponding to the embodiment in FIG. 4B.
Figure 6A:
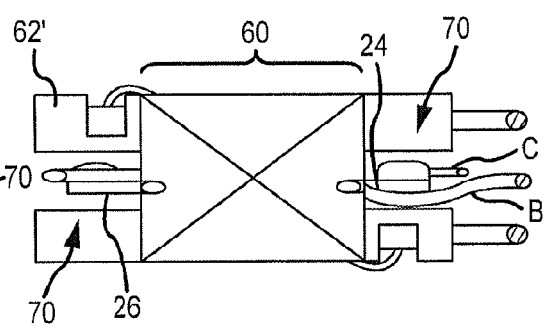
Figure 6C:
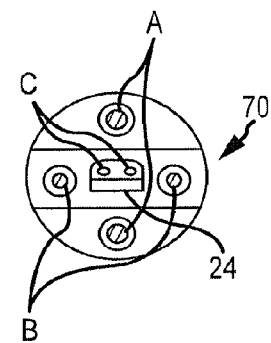

More specifically, the FIG. 6A-6C glans element 62' incorporates one or more slots 70 cutting across the body. The slot(s) can be machined or otherwise formed (e.g., water jet cutting). In any case, it/they provide(s) clearance for the secondary temperature sensor(s) 24, 26.

Figure 7B:
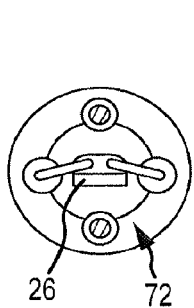
FIGS. 7A-7C are partial side section, distal and proximal views, respectively, of a velocity sensor probe construction corresponding to the embodiment in FIG. 4B.
Figure 7A:
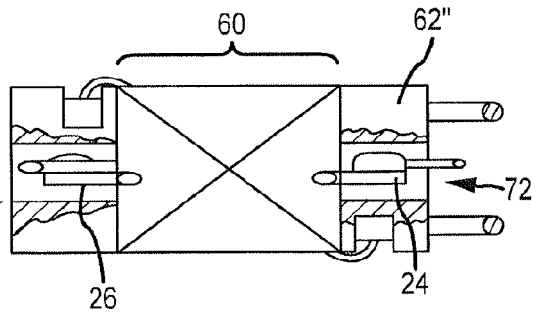
Figure 7C:
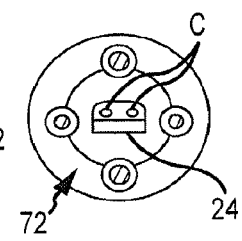

As an alternative, the approach in FIGS. 7A-7C includes counter-bores or recesses 72 serving the same purpose. In such systems, the closest surface of the temperature sensor body/bodies may be touching or inserted within a region of the mandrel over which the wire-wound heated sensor is formed.

Naturally, in three dimensions, there is radial separation of the components. But with conformance to the hardware configuration assumptions above, the one-dimensionality of the mathematical analysis can be maintained. Thus, in relevant part (i.e., x dimension along the length), the spacing is preferably from about 0.05 inches to about zero x (projected) distance from the last turn of the winding (with a small inset/overlap tolerance of about 0.02 inches), or, even more moderately, about 0.10 inches to about zero distance (with an inset/overlap of about 0.03 inches).

If using a distal secondary temperature sensor in the velocity sensor (as shown in each of FIGS. 6A-6C and 7A-7C), glans 62'/62" will typically include four lumen, providing insulated clearance holes for the Pt winding (i.e., heated sensor 22) leads "A" and distal TFRTD (i.e., secondary sensor 26) lead wires "B." Electrical leads "C" for the proximal TFRTD (i.e., secondary sensor 24) extend proximally without need for clearance holes through the mandrel/glans.

Figure 8:
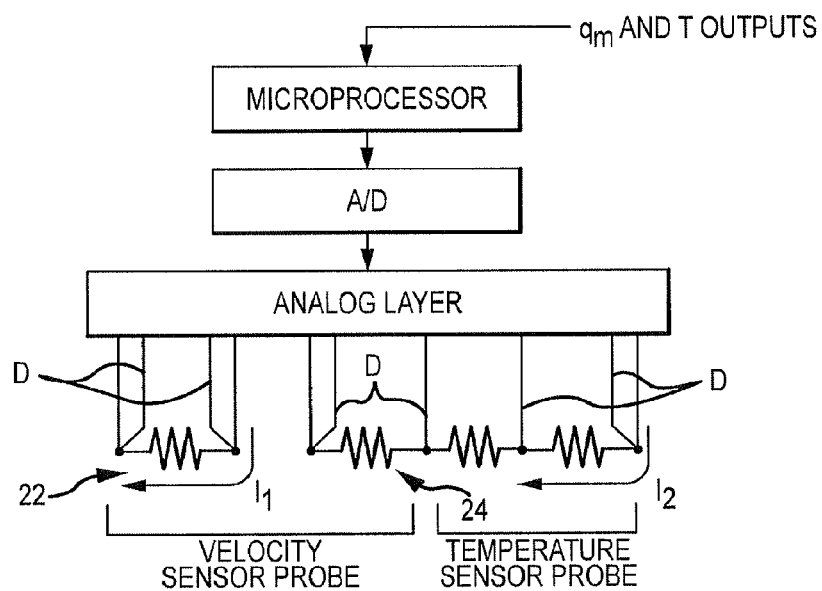
FIG. 8 is a block diagram of suitable electronics hardware for carrying out software operations as variously described.

An overview of optional system-level constructional details are presented in FIG. 8. The block diagram illustrates a microprocessor-based thermal dispersion mass flow meter with the four-temperature flow sensor configuration shown in FIG. 4A. Adaptation to other sensor configurations as discussed herein should be within the ability of those with ordinary skill in the art.

In any case, the components shown may be set within housing 110, along with provision for wired connection or wireless data transmission (such as though Bluetooth, WiFi, etc.). The voltage sensing wires "D" make the measurement of the RTD resistances independent of the length of the flow sensor cable, facilitating remote location of the transmitter.

With the velocity sensor operated in the constant temperature differential mode, heating current $I_1$ depends on the electrical resistance $R_1$ of the velocity sensor 22 and the electrical power input W required to maintain $\Delta T$ constant (i.e. the difference in temperature between the gas and average temperature of the heated sensor). W typically ranges from about 0.1 to 5 watts depending on the "overheat" $\Delta T$, the mass flow rate, and the size of the velocity sensor. The temperature sensing current $I_2$ is held constant and is less than 1 mA to avoid self-heating sensor 24. The "Analog layer" shown includes precision resistors for measuring the currents $I_1$ and $I_2$ but has no bridge circuit. Analog-to-Digital conversion is provided with the "A/D" converter between the Analog layer and a Microprocessor (optionally with on-board ROM, EPROM or other computer readable medium storing instructions). The system (i.e., by calculations preformed by the Microprocessor in accordance with instructions) digitally linearizes the mass flow rate $q_m$ output and (optionally) T and P outputs, providing analog outputs for these variables.

The system may further include algorithms based on the above principle of operation that manage changes in gas selection, gas temperature, and gas pressure in connection with measurements received from the associated hardware. The system may also provides a selection of digital communication protocols, including Hart, Foundation Fieldbus, and Profibus (all trademarked). Likewise, the systems described herein may enable a number of traditional digital functions, such as: a multi-variable digital readout and user interface; digital RS 232 and RS 485 communications; flow meter diagnostics, validation, calibration adjustment, and reconfiguration; flow totalization; and alarms.

Certainly, the thermal anemometers according to examples of the invention retain advantageous performance if operated with either digital or analog sensor-drive electronics, or with a combination of both, in either the constant-temperature or constant-current modes of operation. Digital electronics may be preferred for reason of simplified computations based on heat-transfer correlations and corrective algorithms, that compensate for any changes (e.g., as referenced to flow calibration conditions) in the fluid itself, fluid temperature, fluid pressure, ambient temperature and other variables and influence parameters, thereby yielding higher system accuracy. Said heat-transfer correlations and corrective algorithms may be based on known empirical heat transfer correlations, specific experimental data for the thermal anemometer of the present invention, a gas property library in electronic memory, physics-based heat transfer theory, and other sources.

With a system as described in connection with the above, examples of how a four-temperature microprocessor-based system manages changes in gas selection, gas temperature and gas pressure for air, methane, and argon are provided in FIGS. 9A-9C. These figures are plotted in the conventional manner with the mass velocity Vs shown as the independent variable and the electrical power W shown as the dependent variable, whereas in the system they have reversed roles. The three figures reflect the strong direct dependence the electrical power W has on the thermal conductivity of the gases. Thus, FIG. 9A results from the fact that $k_{methane} > k_{air} > k_{argon}$ and FIGS. 9B and 9C result from the fact that thermal conductivity increases as gas temperature and pressure increase, respectively. The fact that thermal conductivity, and therefore W, increases with gas pressure as shown in FIG. 9C is a phenomenon that has heretofore been ignored, but for higher accuracy applications should be included.

Figure 9A:
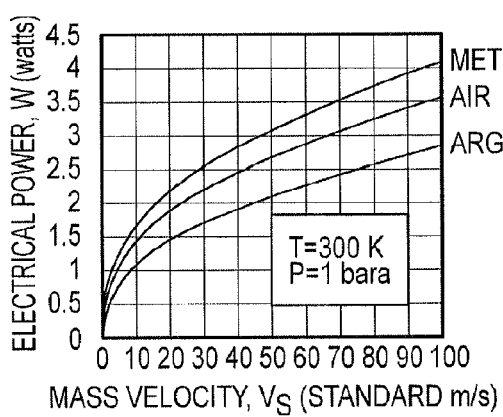
FIGS. 9A-9C are charts illustrating operation according to embodiments of the invention.
Figure 9B:
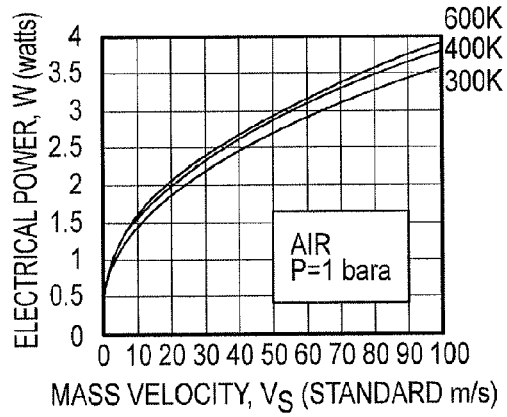
Figure 9C:
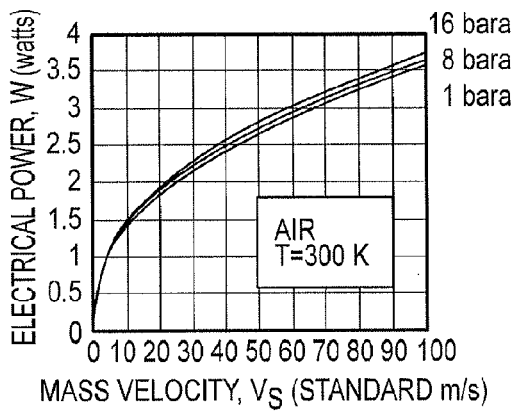

FIGS. 9A-9C also reveal the non-linear, logarithmic nature of the output. A log vs. log plot of these figures (not shown) demonstrates a nearly straight line over approximately 1 to 150 standard m/s. This logarithmic property is responsible for the exceptional rangeability and low-velocity sensitivity of thermal dispersion mass flow meters. A rangeability as high as 100:1 is common. Even higher rangeabilities are achieved with multi-range flow calibration. Detectable minimum point mass velocities as low as approximately 0.1 standard m/s (approximately 20 standard ft/min) are reported by some manufacturers.

Figure 10A:
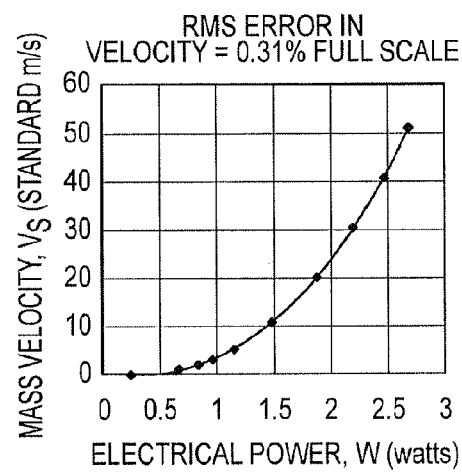
FIGS. 10A-10C are charts illustrating measured vs. actual mass velocity for air and methane, respectively, accomplished with an embodiment of the present invention.
Figure 10B:
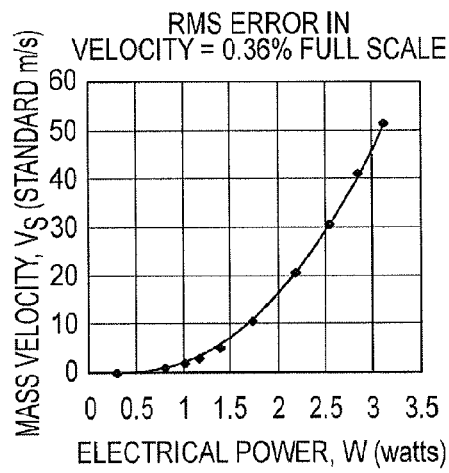
Figure 10C:
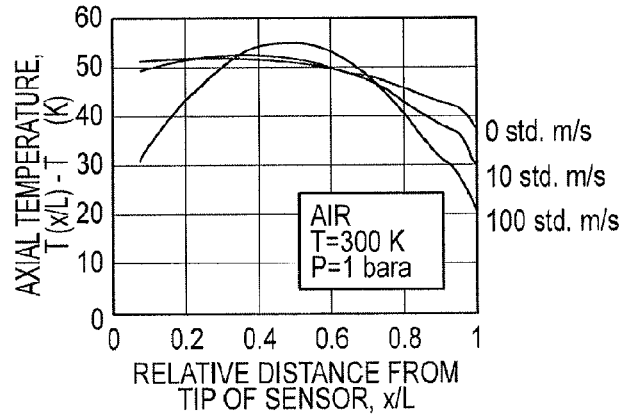

FIGS. 10A-10C show further results of the four-temperature microprocessor based system. FIG. 10C reveals how the temperature distribution $T_1(x)$ of the heated velocity sensor 22 (as shown in FIG. 5) undergoes major changes as the mass velocity Vs increases from 0 to 100 standard m/s. FIGS. 10A and 10B show, for air and methane, the superb comparison between results calculated using the four-temperature microprocessor-based system and actual flow calibration data. Comparisons for other gases are likewise excellent.

Variations

Exemplary aspects of the invention, together with details regarding material selection and manufacture have been set forth above. As for other details of the present invention, these may be appreciated in connection with the above-referenced patents and publications as well as is generally known or appreciated by those with skill in the art. The same may hold true with respect to method-based aspects of the invention in terms of additional acts as commonly or logically employed. Regarding such methods, including methods of manufacture and use, these may be carried out in any order of the events which is logically possible, as well as any recited order of events. Furthermore, where a range of values is provided, it is understood that every intervening value, between the upper and lower limit of that range and any other stated or intervening value in the stated range is encompassed within the invention. Also, it is contemplated that any optional feature of the inventive variations described may be set forth and claimed independently, or in combination with any one or more of the features described herein.

Though the invention has been described in reference to several examples, optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention.

Reference to a singular item includes the possibility that there are a plurality of the same items present. More specifically, as used herein and in the appended claims, the singular forms "a," "an," "said," and "the" include plural referents unless specifically stated otherwise. In other words, use of the articles allow for "at least one" of the subject item in the description above as well as the claims below. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in the claims shall allow for the inclusion of any additional element—irrespective of whether a given number of elements are enumerated in the claim, or the addition of a feature could be regarded as transforming the nature of an element set forth in the claims. Except as specifically defined herein, all technical and scientific terms used herein are to be given as broad a commonly understood meaning as possible while maintaining claim validity. The breadth of the inventive variations is not to be limited to the examples provided and/or the subject specification, but rather only by the scope of the claim language.

What is claimed is:

1. A mass flow meter system for immersion in fluid flow comprising:
    an elongate velocity sensor probe comprising a Resistance Temperature Detector (RTD) having a heated length and a proximal temperature sensor adjacent to a proximal end of the heated length, an active region of the proximal temperature sensor located at a first distance from the proximal end of the heated length, the first distance being equal to or less than about three times a diameter of the velocity sensor probe; and
    a computer processor programmed to calculate mass flow rate based on a computational model corresponding to a relationship of heat conduction in the velocity sensor probe and convection of fluid flow relative to electrical power supplied to the RTD, using a first temperature measurement from the RTD and a second temperature measurement from the proximal temperature sensor with the second temperature measurement used as a boundary condition in the computational model.

2. The system of claim 1, further comprising an elongate temperature sensor probe spaced apart from the velocity sensor probe, the temperature sensor probe including a first temperature sensor located adjacent to a distal end of the temperature sensor probe.

3. The system of claim 2, wherein the temperature sensor probe further comprises a second temperature sensor located proximal to the first temperature sensor with an active region of the first temperature sensor separated from an active region of the second temperature sensor by a second distance, the second distance being equal to or greater than about two times a diameter of the temperature sensor probe.

4. The system of claim 1, further comprising a distal temperature sensor within the velocity sensor probe adjacent to a distal end of the heated length of the RTD.

5. The system of claim 4, wherein an active region of the distal temperature sensor is located at a third distance within the velocity sensor probe from the distal end of the heated length, the third distance being equal to or greater than the diameter of the velocity sensor probe.

6. The system of claim 4, wherein the distal temperature sensor within the velocity sensor probe is located within about two and about three diameters distance from the heated length.

7. The system of claim 4, wherein a surface of at least one of the proximal and distal temperature sensors within the velocity sensor probe is located within about 0.1 inches of the heated length.

8. The system of claim 4, with no separate temperature sensor probe.

9. The system of claim 4, wherein the RTD comprises a platinum wire winding, the winding set upon and encircling a non-conductive spacer, and wherein the spacer receives the distal temperature sensor therein at a distal end.

10. The system of claim 9, wherein the spacer receives the proximal temperature sensor therein at a proximal end.

11. The system of claim 9, wherein at least one of the proximal temperature sensor and the distal temperature sensor comprises a thin-film RTD.

12. The system of claim 9, wherein the non-conductive spacer includes four lumens with two lumens receiving electrical leads for the heated sensor and two lumens receiving electrical leads for the distal temperature sensor.

13. The system of claim 1, wherein the computer processor is adapted for outputting mass velocity measurements in real time.

14. The system of claim 13, further comprising a transmitter for wireless communication of the measurements.

15. The system of claim 1, wherein the RTD comprises a platinum wire winding, the winding set upon a non-conductive spacer.

16. The system of claim 15, wherein the spacer receives the proximal temperature sensor therein at a proximal end.

17. The system of claim 1, wherein the proximal temperature sensor comprises a thin-film RTD.

18. The system of claim 1, wherein the proximal sensor first distance is equal to or less than about two times a diameter of the velocity sensor probe.

19. The system of claim 18, wherein the proximal sensor first distance is equal to or less than about one diameter of the velocity sensor probe.

20. The system of claim 19, wherein the active region of the proximal sensor is in contact with the heated length.

* * * * *